US010223507B2

United States Patent
Kordik

(10) Patent No.: US 10,223,507 B2
(45) Date of Patent: Mar. 5, 2019

(54) DETERMINISTIC CODE FINGERPRINTING FOR PROGRAM FLOW MONITORING

(71) Applicant: Infineon Technologies AG, Neubiberg (DE)

(72) Inventor: Klemens Kordik, Linz (AT)

(73) Assignee: Infineon Technologies AG, Neubiberg (DE)

( * ) Notice: Subject to any disclaimer, the term of this patent is extended or adjusted under 35 U.S.C. 154(b) by 126 days.

(21) Appl. No.: 15/337,343

(22) Filed: Oct. 28, 2016

(65) Prior Publication Data

US 2018/0121272 A1    May 3, 2018

(51) Int. Cl.
*G06F 21/00*    (2013.01)
*G06F 11/36*    (2006.01)

(52) U.S. Cl.
CPC .............. *G06F 21/00* (2013.01); *G06F 11/36* (2013.01)

(58) Field of Classification Search
CPC ............................... G06F 11/07; G06F 11/079
USPC ........................................................... 714/51
See application file for complete search history.

(56) References Cited

U.S. PATENT DOCUMENTS

| | | | | |
|---|---|---|---|---|
| 8,166,261 B1 * | 4/2012 | Cremelie | .......... | G06F 17/30097 707/692 |
| 8,321,352 B1 * | 11/2012 | Rameshkumar | ........ | G06F 21/12 705/51 |
| 9,032,171 B2 * | 5/2015 | Niles | .................... | G06F 11/1453 707/640 |
| 9,323,920 B2 | 4/2016 | Wenzel | | |
| 2003/0046609 A1 * | 3/2003 | Farchi | ................. | G06F 11/3676 714/30 |
| 2004/0015747 A1 * | 1/2004 | Dwyer | ...................... | G06F 8/54 714/47.1 |
| 2010/0250858 A1 * | 9/2010 | Cremelie | .......... | G06F 17/30159 711/136 |
| 2012/0246452 A1 * | 9/2012 | Gammel | ............. | G06F 11/1004 712/226 |
| 2013/0019231 A1 * | 1/2013 | Mangard | .................. | G06F 8/43 717/151 |

(Continued)

OTHER PUBLICATIONS

Understanding and Using Cyclic Redundancy Checks with Maxim 1-Wire and iButton Products. https://www.maximintegrated.com/en/app-notes/index.mvp/id/27. 15 pages.

*Primary Examiner* — Kamini B Patel
(74) *Attorney, Agent, or Firm* — Eschweiler & Potashnik, LLC

(57) ABSTRACT

A programmable system with program flow monitoring is provided. A memory is configured to store a set of instructions, where the instructions are configured to be executed in a predefined order. A processor is configured to execute the set of instructions by fetching and executing the instructions in the predefined order. A program flow monitoring (PFM) unit is configured to deterministically generate a fingerprint from accesses to the memory, such as instruction fetches, while executing the set of instructions. A verification unit is configured to compare the generated fingerprint to an expected fingerprint to determine whether the set of instructions executed in the predefined order. A method for program flow monitoring, as well as a safety system within which the programmable system finds application, are also provided.

20 Claims, 8 Drawing Sheets

(56) References Cited

U.S. PATENT DOCUMENTS

| | | | |
|---|---|---|---|
| 2013/0097380 A1* | 4/2013 | Colgrove | G06F 17/30159 711/118 |
| 2014/0074719 A1* | 3/2014 | Gressel | G06Q 20/3827 705/64 |
| 2015/0113637 A1* | 4/2015 | Wenzel | G06F 21/52 726/22 |

* cited by examiner

DETERMINISTIC CODE FINGERPRINTING FOR PROGRAM FLOW MONITORING

FIELD

The present disclosure relates to systems and methods for program flow monitoring using deterministic code fingerprinting.

BACKGROUND

A processor is designed to execute a program, which is set of instructions configured for execution in a predefined order. When the program is executed, it is expected that the instructions are executed in the predefined order. However, in some situations, the order with which the instructions are executed may deviate from the predefined order. Such deviations may be caused by, for example, hardware errors, electromagnetic radiation, or malicious interference. For some applications, it's sufficient that the instructions execute according to the predefined order most of the time. However, for certain other applications, it's important that the instructions always execute according to the predefined order. For example, it's important that the instructions always execute according to the predefined order for safety-related applications.

Some automotive radar systems are employed to ensure the safety of drivers and passengers by, for example, providing lane change assistance, blind spot monitoring, and/or automatic breaking. Due to the safety importance of the automotive radar systems, safety monitoring units and safety controllers may be employed to monitor devices of the automotive radar systems. The safety monitoring units are hardware devices configured to perform tests on the monitored devices. For example, a safety monitoring unit may be configured to input a radio frequency (RF) signal into an RF receive chain and to compare an output of the receive chain to an expected output. The safety controllers are programmable devices comprising memories configured to store programs, as well as processors configured to execute the programs to trigger the tests and, in some embodiments, evaluate results of the tests. As such, it's important that instructions of the programs are executed according to predefined orders.

One approach for reducing the likelihood of instructions being executed out of order is to design processors to higher standards. For example, whereas processors in the automotive industry are often designed to meet the quality management standard of ISO/TS 16949, the processors may be designed to meet the higher, safety standard of ISO 26262. However, designing the processors to meet higher standards is challenging and costly given the complexity of the processors. Another approach for reducing the likelihood of instructions being executed out of order is to implement programs as state machines. However, implementing the programs as state machines reduces the ease with which the programs can be changed.

SUMMARY

The present disclosure provides systems and methods for program flow monitoring using deterministic code fingerprinting. A processor is configured to execute a set of instructions from a memory in a predefined order, where the instructions include deterministic code segments and non-deterministic code segments. As the processor executes the set of instructions, the processor performs a series of memory accesses to fetch the instructions from the memory and, in some embodiments, to load and/or store data respectively from and/or to the memory. A program flow monitoring (PFM) unit is configured to deterministically generate a fingerprint from memory accesses during execution of the deterministic code segments, but not during execution of the non-deterministic code segments. After executing the set of instructions, a verification unit is configured to compare the generated fingerprint to an expected fingerprint to determine whether the instructions executed in the predefined order. If the generated fingerprint matches the expected fingerprint, there is advantageously a high likelihood that the instructions were executed in the predefined order. Otherwise, corrective measures may advantageously be taken and/or alerts may advantageously be generated.

In some embodiments, the PFM unit is implemented in hardware and is independent of the processor. In some of these embodiments, the PFM unit is designed and/or manufactured to a higher standard than the processor. For example, the processor may be designed and/or manufactured to a quality management standard, such as ISO/TS 16949, whereas the PFM unit may be designed and/or manufactured to a higher, safety standard, such as ISO 26262. Designing and/or manufacturing the PFM unit to the higher standard is advantageous for reliably determining whether the instructions executed in the predefined order.

Further, in some embodiments, the PFM unit is employed within a safety system configured to monitor a device, such as, for example, a device of an automotive radar system. The safety system comprises a safety monitoring unit, a safety controller, the PFM unit, and a verification unit. The safety monitoring unit is a hardware device configured to perform a test on the monitored device. The safety controller is a programmable device comprising a memory configured to store a set of instructions, as well a processor configured to execute the instructions to trigger the test and, in some embodiments, evaluate a result of the test. The PFM unit is a hardware device configured to generate a fingerprint from memory accesses by the processor while executing deterministic segments of the instructions. The verification unit is a hardware device or software configured to verify that the fingerprint matches an expected fingerprint.

DETAILED DESCRIPTION

The following detailed description makes reference to the accompanying drawings which constitute a part of the disclosure and in which, for purposes of illustration, special example embodiments are shown, whereby the disclosure can be practically realized. It is understood that other example embodiments may be employed, and that structural and other changes may be implemented, without going beyond the scope of protection of the present disclosure. Thus, the following detailed description should not be regarded as being limitative. Rather, the scope of protection of the present disclosure is defined only by the accompanying patent claims.

Figure 1:
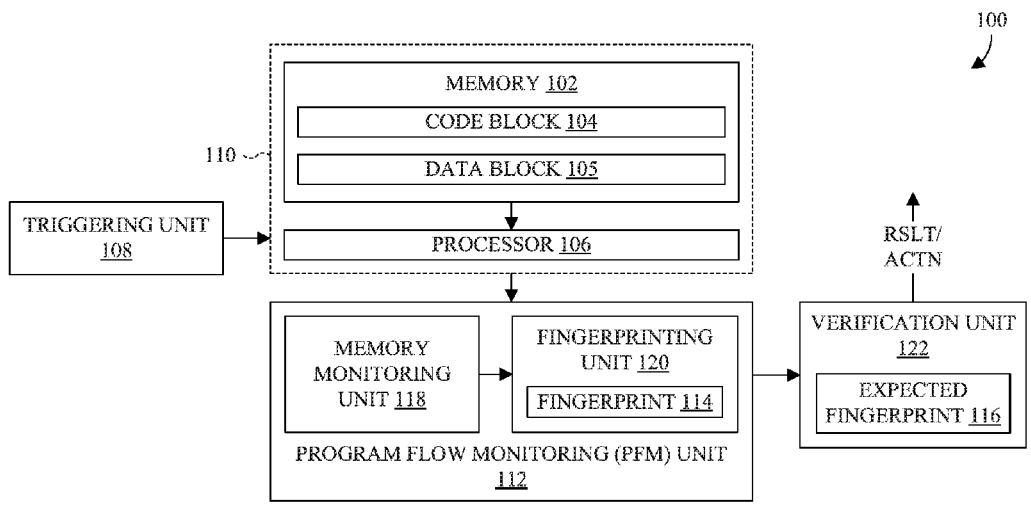
FIG. 1 illustrates a block diagram of some embodiments of a programmable system using deterministic code fingerprinting for program flow monitoring.

With reference to FIG. 1, a block diagram 100 of some embodiments of a programmable system using deterministic code fingerprinting for program flow monitoring (PFM) is provided. As illustrated, a memory 102 is configured to store a code block 104 and, in some embodiments, a data block 105. The code block 104 is a set of instructions that are configured for execution in a predefined order to carry out a task or function. Further, the code block 104 may be a program, a function of a program, or a segment of a function or program. The data block 105 is a set of data elements accessed (e.g., read and/or written) during execution of the code block 104. The data elements may be, for example, non-executable data elements, and/or may be, for example, words or bytes of data. The memory 102 may be, for example, a read-only memory (ROM) device and/or a flash memory device.

A processor 106 is configured to execute the code block 104 from the memory 102 in the predefined order. As the processor 106 executes the code block 104, the processor 106 performs a series of memory accesses to fetch the instructions from the memory 102 and, in some embodiments, to load and/or store data elements respectively from and/or to the memory 102. In some embodiments, the processor 106 begins execution of the code block 104 in response to a trigger from a triggering unit 108. The processor 106 may be, for example, a microprocessor, and/or may be, for example, integrated with the memory 102 in a microcontroller 110. The triggering unit 108 may be, for example, a hardware device, or another code block executed by the processor 106 or another processor.

While the processor 106 ideally executes the instructions of the code block 104 according to the predefined order, there may be deviations between the executed order and the predefined order. Such deviations may be caused by, for example, hardware errors, electromagnetic radiation, or malicious interference. Therefore, a PFM unit 112 is configured to monitor memory accesses by the processor 106, and to deterministically generate a fingerprint 114 from memory accesses while executing deterministic code of the code block 104. If the generated fingerprint 114 matches an expected fingerprint 116, there is advantageously a high likelihood that the instructions of the code block 104 executed in the predefined order. In some embodiments, the memory accesses used for fingerprinting are limited to instruction fetches. In other embodiments, the memory accesses used for fingerprinting are limited to accesses to data elements. In yet other embodiments, the memory accesses used for fingerprinting comprise instruction fetches, as well as accesses to data elements.

The PFM unit 112 comprises a memory monitoring unit 118 and a fingerprinting unit 120. The memory monitoring unit 118 is configured to monitor memory accesses by the processor 106, and to selectively provide memory accesses by the processor 106 to the fingerprinting unit 120. For example, the memory monitoring unit 118 may provide instructions or data elements accessed by the processor 106 to the fingerprinting unit 120. The fingerprinting unit 120 is configured to deterministically generate the fingerprint 114 based on memory accesses received from the memory monitoring unit 118, and in a manner that accounts for the order in which the memory accesses are received from the memory monitoring unit 118. For example, the fingerprinting unit 120 may be configured to deterministically generate the fingerprint 114 based on instructions and/or data elements received from the memory monitoring unit 118.

A verification unit 122 is configured to receive the fingerprint 114 from the PFM unit 112, and to verify that the fingerprint 114 matches the expected fingerprint 116. In some embodiments, the verification unit 122 outputs a result of the verification. Further, in some embodiments, the verification unit 122 takes some form of action based on whether the fingerprint 114 matches the expected fingerprint 116. For example, the verification unit 122 may generate an audio and/or visual alert. The verification unit 122 may be, for example, a hardware device, or another code block executed by the processor 106 or another processor.

In view of the foregoing, the PFM unit 112 advantageously allows a memory access pattern associated with the code block 104 to be used for identification of deviations between the predefined order of the code block 104 and the executed order of the code block 104. In applications where the code block 104 is critical for safety or other reasons, problems can advantageously be averted by notifying the relevant parties and/or taking corrective actions, such as, for example, re-executing the code block 104.

Figure 2:
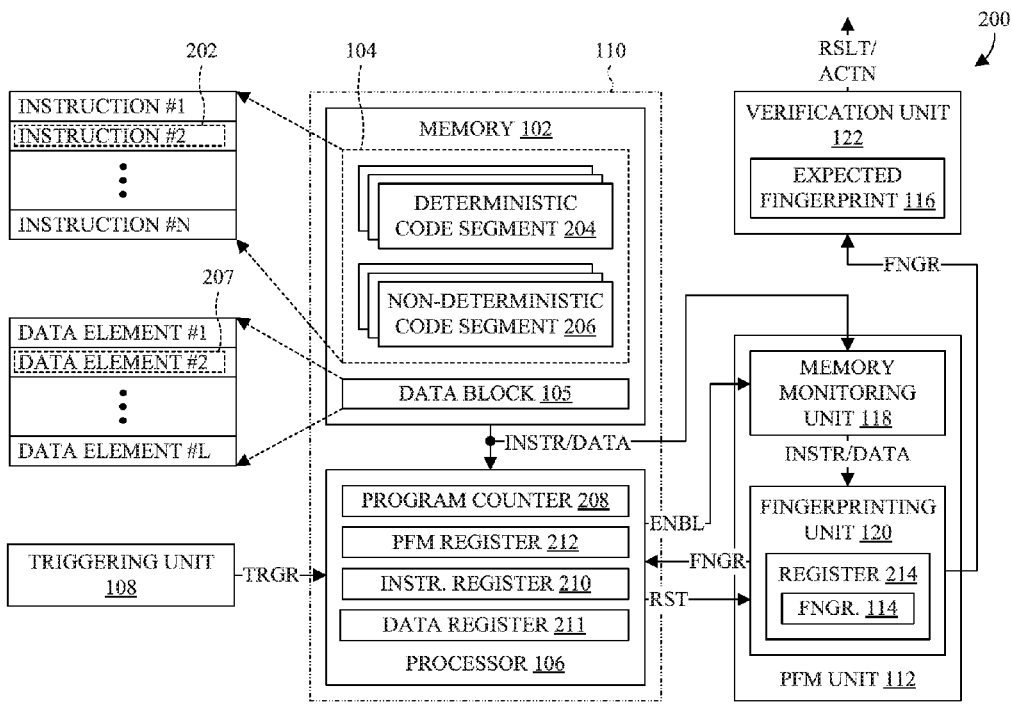
FIG. 2 illustrates a block diagram of some more detailed embodiments of the programmable system of FIG. 1.

With reference to FIG. 2, a block diagram 200 of some more detailed embodiments of the programmable system of FIG. 1 is provided. As illustrated, a memory 102 is configured to store a code block 104. The code block 104 is a set of instructions 202 that are configured for execution in a predefined order and that are stored at respective addresses in the memory 102. For example, the code block 104 may have N>1 instructions stored at respective addresses in the memory 102. In some embodiments, the addresses at which the instructions 202 are stored are consecutively ordered according to the predefined order. In other embodiments, the addresses at which the instructions 202 are stored are disjointed and/or are ordered differently than the predefined order due to, for example, jump instructions.

The instructions 202 comprise corresponding operation codes and, in some embodiments, one or more of the instructions 202 comprise corresponding operands (e.g., data). For example, an instruction may be an opcode, or may be an opcode and one or more operands. Further, the instructions 202 are grouped into one or more deterministic code segments 204 and, in some embodiments, one or more non-deterministic code segments 206. A deterministic code segment is subset of the instructions 202 that always executes in the same order and with the same data. A non-deterministic code segment is a subset of the instructions 202 that executes in a different order and/or with different data depending upon random variables.

In some embodiments, the memory 102 further comprises a data block 105. The data block 105 is a set of data elements 207 that are accessed during execution of the code block 104 and that are stored at respective addresses in the memory 102. For example, the data block 105 may have L>1 data elements stored at respective addresses in the memory 102. The addresses at which the data elements 207 are stored may be, for example, consecutive or disjoint. In some embodiments, the data elements 207 are 8, 16, 24, 32, 64, or 128 bit words. Further, in some embodiments, the data elements 207 are non-executable data and/or data that is not executed while executing the code block 104.

A processor 106 is configured to execute the code block 104 by fetching and executing the instructions 202 from the memory 102 in the predefined order. For example, the processor 106 may initially fetch and execute a first instruction of the code block 104. Thereafter, the processor 106 may repeatedly fetch and execute a next instruction of the code block 104 per the predefined order. Further, in some embodiments, the processor 106 is configured to load data elements from the memory 102, and/or to store data elements to the memory 102, while executing the instructions 202. For example, while executing a load instruction, the processor 106 may load one of the data elements 207 to a local register of the processor 106. As another example, while executing a store instruction, the processor 106 may store data to the memory 102 as one of the data elements 207. Even more, in some embodiments, the processor 106 is configured to begin execution of the code block 104 in response to a trigger from a triggering unit 108. The processor 106 may be, for example, a microprocessor or some other electronic processor, and/or may be, for example, integrated with the memory 102 in a microcontroller 110.

To facilitate the execution of the code block 104, the processor 106 comprises a program counter (PC) register 208, an instruction register 210, and a data register 211. The PC register 208 is configured to store a memory address identifying where the processor 106 is to load the next instruction from. For example, the PC register 208 may be incremented as the instructions 202 are executed and/or may be set per certain instructions of the code block 104, such as jump instructions. The instruction register 210 is configured to store the instruction that the processor 106 is currently operating on and is loaded from the memory 102 during fetching. The data register 211 is configured to store data manipulated by the processor 106 during execution of the code block 104. The data register 211 may, for example, be loaded from one of the data elements 207 and/or stored to the memory 102 as one of the data elements 207. Further, in some embodiments, the processor 106 comprises a PFM register 212 configured to store to a fingerprint 114 loaded from a PFM unit 112.

In operation, the order in which the processor 106 executes the instructions 202 may deviate from the predefined order. For example, electromagnetic radiation may toggle a bit of the PC register 208, such that the processor 106 loads a next instruction from the wrong memory address. As another example, electromagnetic radiation or malicious interference may change an instruction stored in the memory 102, such that the wrong instruction may be fetched by the processor 106. As yet another example, an address bus between the processor 106 and the memory 102 may be failing, such that the processor 106 loads a next instruction from the wrong memory address. The PFM unit 112 may be employed to mitigate problems arising from the deviations between the executed order of the instructions 202 and the predefined order.

The PFM unit 112 is configured to monitor memory accesses by the processor 106, and to deterministically generate the fingerprint 114. The fingerprint 114 is an error-checking value generated based on memory accesses while executing the deterministic code segment(s) 204, and the order in which the memory accesses are performed. For example, the fingerprint 114 may be generated based on instruction fetches from the memory 102, read and/or write operations respectively from and/or to the data block 105, some other memory accesses, or a combination of the foregoing. The PFM unit 112 is independent of the processor 106, such that the PFM unit 112 may be designed and/or manufactured according to a higher standard than the processor 106. For example, the processor 106 may be designed and/or manufactured according to a quality management standard, such as ISO/TS 16949, whereas the PFM unit 112 may be designed and/or manufactured according to a higher, safety standard, such as ISO 26262. Further, in some embodiments, the PFM unit 112 is implemented in hardware. The PFM unit 112 comprises a memory monitoring unit 118 and a fingerprinting unit 120.

The memory monitoring unit 118 is configured to monitor memory accesses by the processor 106, and to provide memory accesses by the processor 106 to the fingerprinting unit 120. In some embodiments, the memory monitoring unit 118 provides instructions fetched by the processor 106 to the fingerprinting unit 120, but not data elements accessed by the processor 106 to the fingerprinting unit 120. In other embodiments, the memory monitoring unit 118 provides data elements accessed by the processor 106 to the fingerprinting unit 120, but not instructions fetched by the processor 106 to the fingerprinting unit 120. In yet other embodiments, the memory monitoring unit 118 provides both instructions and data elements accessed by the processor 106 to the memory monitoring unit 118. The memory monitoring unit 118 may, for example, monitor memory accesses through a databus between the processor 106 and the memory 102. Additionally or alternatively, the memory monitoring unit 118 may, for example, monitor instruction fetches through the instruction register 210. In some embodiments, the processor 106 is configured to enable the memory monitoring unit 118 while executing the deterministic code segment(s) 204, and to disable the memory monitoring unit 118 while executing the non-deterministic code segment(s) 206.

The fingerprinting unit 120 comprises an internal register 214 storing the fingerprint 114, and is configured to generate the fingerprint 114 based on memory accesses received from the memory monitoring unit 118 following a last reset of the internal register 214. The received memory accesses may be, for example, instruction fetches and/or accesses to the data block 105. As memory accesses following the last reset are received, the fingerprint 114 is repeatedly updated to advantageously encode the order in which the memory accesses are received. The processor 106 may, for example, be configured to reset the internal register 214 immediately before executing the code block 104. Further, the fingerprinting unit 120 is configured to generate the fingerprint deterministically so it always generates the fingerprint 114 with the same value for a given input. For example, the fingerprinting unit 120 may be configured to deterministically generate the fingerprint 114 using a cyclic redundancy check (CRC) or a hash function.

A verification unit 122 is configured to receive the fingerprint 114 from the PFM unit 112, and to verify that the fingerprint 114 matches an expected fingerprint 116 for instructions executed since the last reset of the internal register 214. For example, after completing the code block 104, the fingerprint 114 may be compared to the expected fingerprint 116. Where the fingerprint 114 matches the expected fingerprint 116, and the fingerprint 114 was generated from only deterministic code, there is advantageously a high likelihood that the instructions of the fingerprint 116 executed with the proper order and/or data.

Figure 3A:
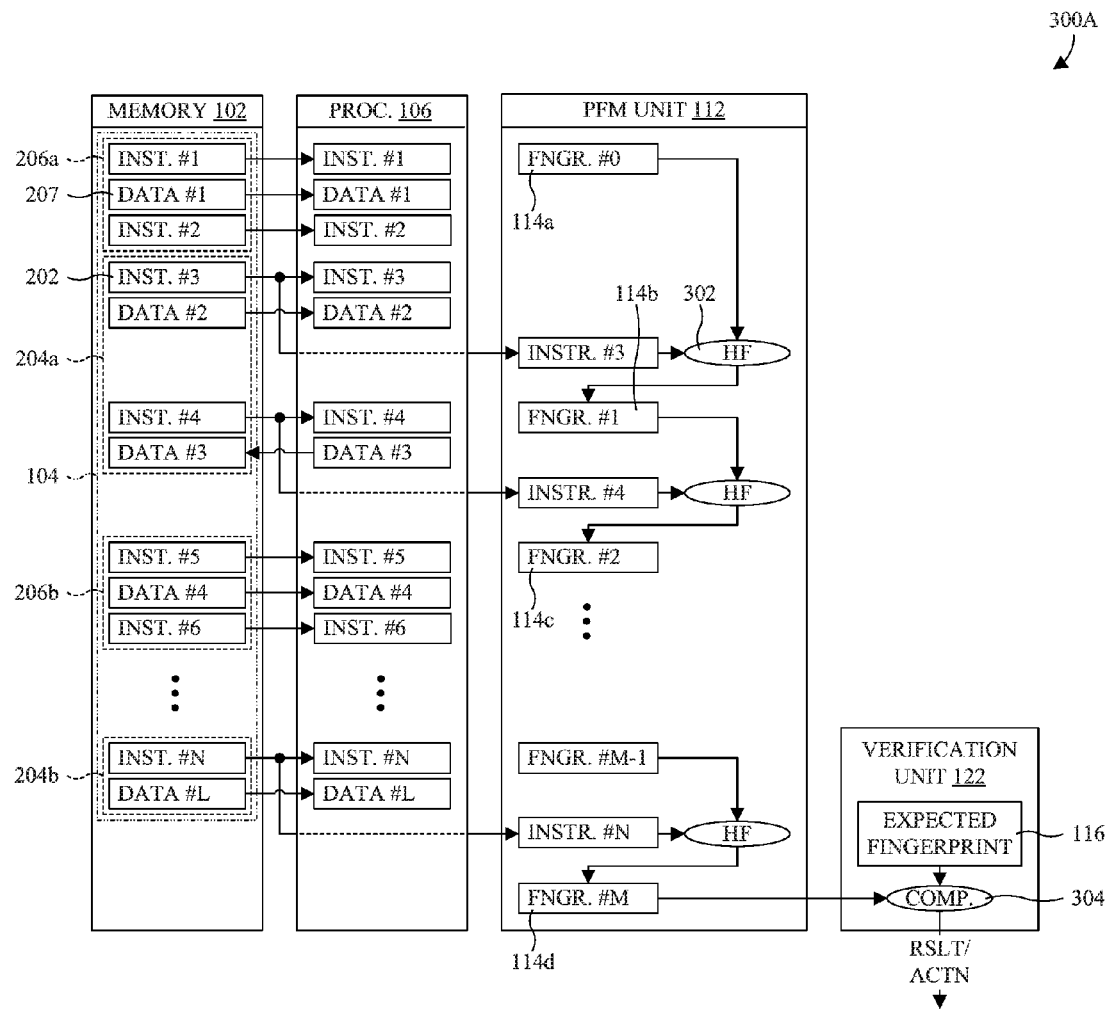
FIGS. 3A-3C illustrate block diagrams of various embodiments of fingerprinting using the programmable system of FIGS. 1 and/or 2.
Figure 3B:
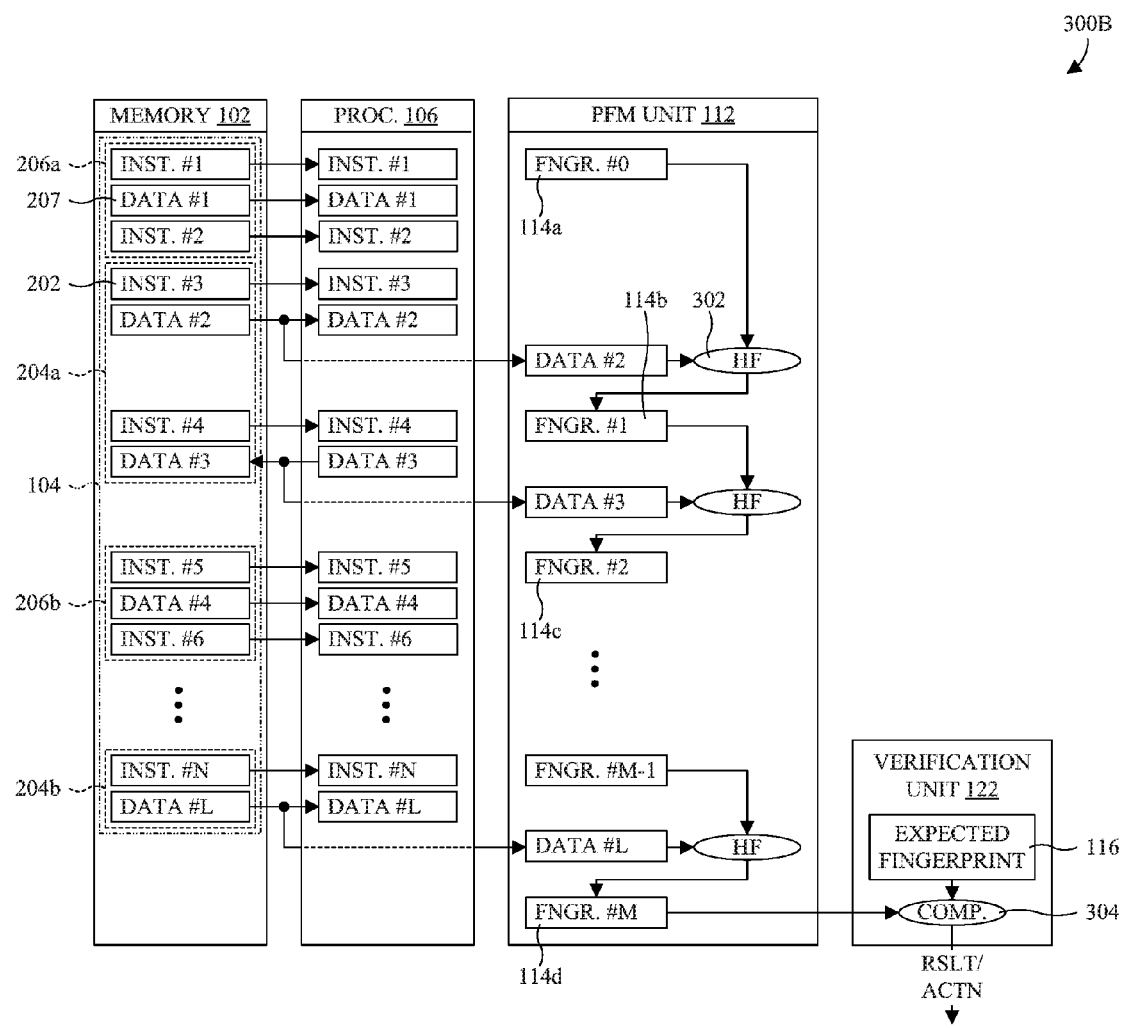
Figure 3C:
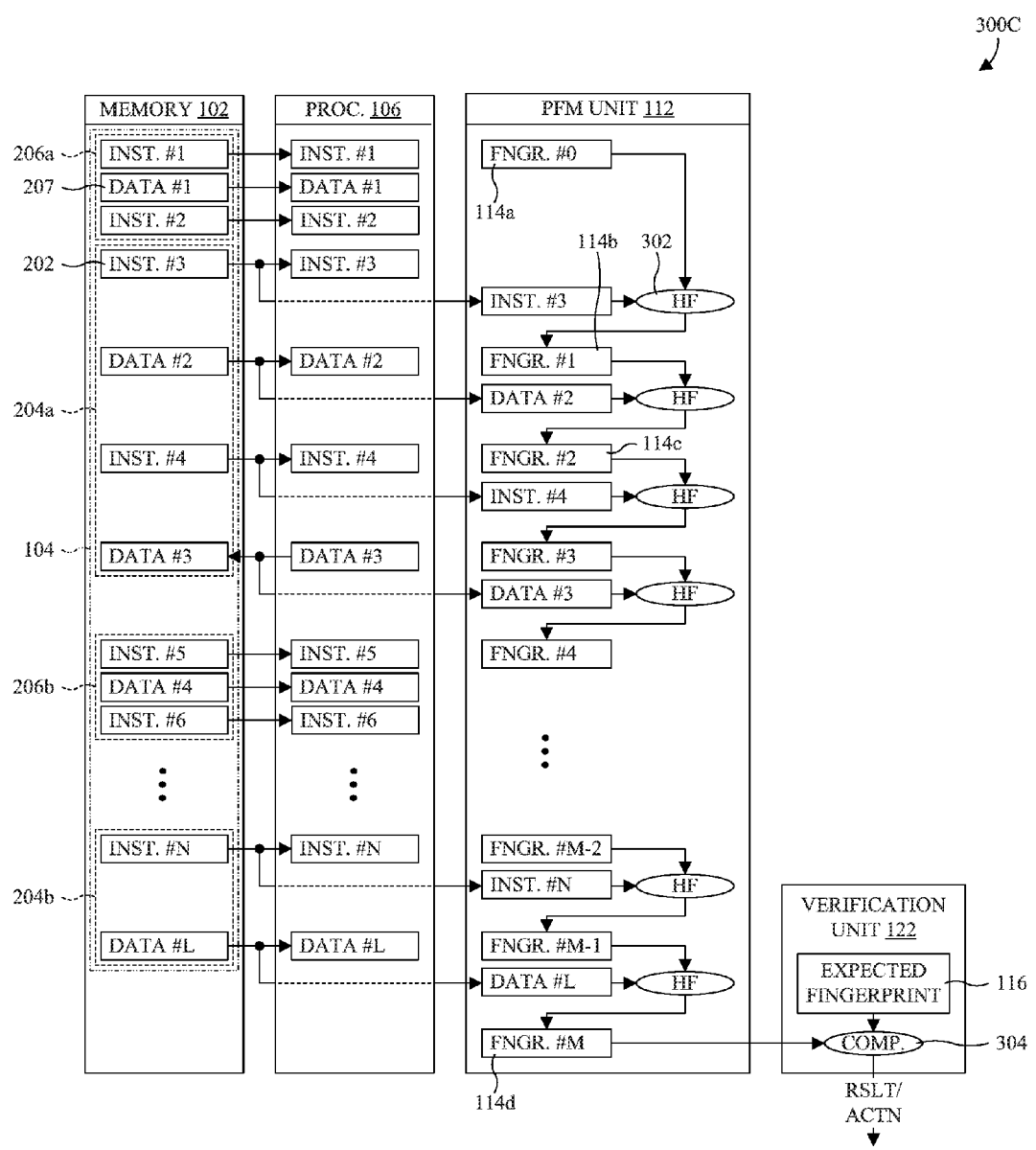

With reference to FIGS. 3A-3C, block diagrams 300A-300C of various embodiments of fingerprinting using the programmable system of FIGS. 1 and/or 2 are provided. As illustrated by the block diagram 300A of FIG. 3A, a processor 106 executes a code block 104 of instructions 202 from a memory 102. The code block 104 comprises N instructions, and M<N instructions that are deterministic. Further, in some embodiments, the processor 106 accesses a data block of data elements 207 from the memory 102 while executing the code block 104. The data block comprises L>=1 data elements. A PFM unit 112 selectively generates fingerprints 114a-114d from instruction fetches by the processor 106, but not accesses to the data elements 207 by the processor 106, and a verification unit 122 verifies the instructions 202 are executed according to a predefined order using the generated fingerprints 114a-114d.

To begin, the PFM unit 112 is reset, thereby resulting in a null fingerprint 114a (e.g., fingerprint #0). Further, the processor 106 fetches and executes instructions of a first non-deterministic code segment 206a from the memory 102. For example, instruction #1 may be fetched and executed by the processor 106, and instruction #2 may be subsequently fetched and executed by the processor 106. Because the instructions of the first non-deterministic code segment 206a are non-deterministic, the order with which the instructions are executed and/or the data of the instructions may vary. Therefore, the instructions are not used for fingerprinting. Even more, in some embodiments, while executing the first non-deterministic code segment 206a, one or more data elements are accessed by the processor 106. For example, while executing instruction #1, data element #1 may be loaded to a local register of the processor 106.

After executing the first non-deterministic code segment 206a, the processor 106 fetches and executes instructions of a first deterministic code segment 204a from the memory 102. For example, instruction #3 may be fetched and executed by the processor 106, and instruction #4 may be subsequently fetched and executed by the processor 106. Further, as instructions of the first deterministic code segment 204a are fetched, the null fingerprint 114a is updated using a hash function 302. For example, the null fingerprint 114a may be combined with instruction #3 using the hash function 302 to generate a first error-checking fingerprint 114b, and the first error-checking fingerprint 114b may be combined with instruction #4 using the hash function 302 to generate a second error-checking fingerprint 114c. The hash function is deterministic and implemented in hardware. Further, in some embodiments, is based on a CRC or secure hash algorithm 1 (SHA-1). While executing the first deterministic code segment 204a, in some embodiments, one or more data elements are accessed by the processor 106. For example, data element #2 may be loaded to a local register of the processor 106 while executing instruction #3, and a local register of the processor 106 may be stored to the memory 102 as data element #3 while executing instruction #4.

The processor 106 thereafter continues to execute a remainder of the code block 104, such as, for example, a second non-deterministic code segment 206b and a second deterministic code segment 204b. The second non-deterministic code segment 206b may, for example, be ignored by the PFM unit 112, as done for the first non-deterministic code segment 206a, whereas the second deterministic code segment 204b may, for example, be processed by the PFM unit 112, as done for the first deterministic code segment 204a. Upon completion of the remainder of the code block 104, a final fingerprint 114d (e.g., fingerprint #M) remains that takes into account deterministic instructions of the code block 104 and the order in which the deterministic instructions are fetched and executed by the processor 106.

The verification unit 122 receives the final fingerprint 114d from the PFM unit 112 and a comparison function 304 compares the final fingerprint 114d to an expected fingerprint 116. Where the final fingerprint 114d matches the expected fingerprint 116, there is advantageously a high likelihood that the instructions of the final fingerprint 114d executed with the proper order and/or data. In some embodiments, the verification unit 122 outputs a result of the verification. Further, in some embodiments, the verification unit 122 takes some form of action based on whether the final fingerprint 114d matches the expected fingerprint 116.

While the code block 104 was illustrated with two deterministic code segments 204a, 204b and two non-deterministic code segments 206a, 206b, it is to be appreciated that other embodiments of the code block 104 may comprise more or less deterministic code segments and/or more or less non-deterministic code segments. Further, while the code block 104 was illustrated with a particular ordering for the two deterministic code segments 204a, 204b and the two non-deterministic code segments 206a, 206b, it is to be appreciated that other embodiments of the code block 104 may have different orderings. Further, while the two deterministic code segments 204a, 204b and two non-deterministic code segments 206a, 206b were each illustrated with two instructions, it is to be appreciated that the deterministic and/or the non-deterministic code segments 204a, 204b, 206a, 206 may each have more or less instructions. Further, while the data elements 207 were illustrated with particular associations to the instructions 202, it is to be appreciated that different associations are amenable. Further, while L data elements were illustrated, more or less data elements are amenable.

As illustrated by the block diagram 300B of FIG. 3B, a variant of FIG. 3A is provided in which the PFM unit 112 selectively generates fingerprints 114a-114d from accesses to the data elements 207 by the processor 106, but not fetches of the instructions 202 by the processor 106. Further, the PFM unit 112 limits the fingerprinting to accesses to the data elements 207 that occur during execution of deterministic code segments since the accesses are the same for each execution of the deterministic code segments. In such embodiments, the processor 106 has M<=L accesses to the data elements 207 during execution of the deterministic code segments.

As illustrated by the block diagram 300C of FIG. 3C, a variant of FIG. 3A is provided in which the PFM unit 112 selectively generates fingerprints 114a-114d from accesses of the instructions 202 and the data elements 207 by the processor 106. Further, the PFM unit 112 limits the fingerprinting to accesses to the instructions 202 and the data elements 207 that occur during execution of deterministic code segments since the accesses are the same for each execution of the deterministic code segments. In such embodiments, the processor 106 has M accesses during execution of the deterministic code segments.

Figure 4:
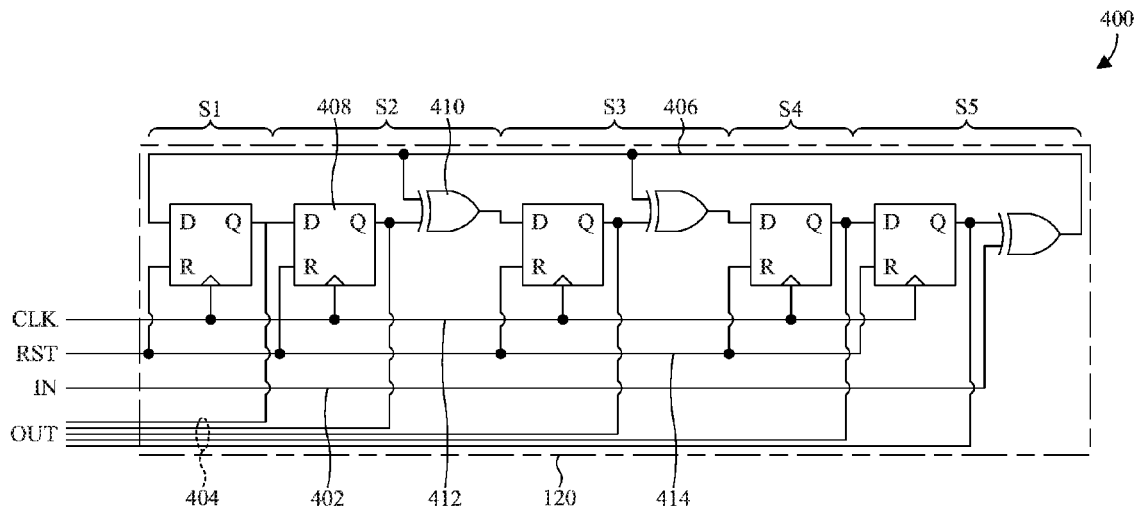
FIG. 4 illustrates a block diagram of some embodiments of a fingerprinting unit of FIGS. 1 and/or 2.

With reference to FIG. 4, a block diagram 400 of some embodiments of the fingerprinting unit 120 of FIGS. 1 and/or 2 is provided. As illustrated, the fingerprinting unit 120 is configured to deterministically generate a CRC value of input data received serially over an input line 402, and to output the CRC value in parallel over an output line 404. For example, the input data may be received one bit at a time (e.g., one bit per clock cycle), and bits of the CRC value may be output in parallel. The input data may, for example, correspond to memory accesses by the processor 106 of FIGS. 1 and/or 2, and the CRC value may, for example, correspond to the fingerprint 114 of FIGS. 1 and/or 2. The memory accesses may comprise, for example, fetched instruction, and/or data elements read and/or stored to memory. Further, the fingerprinting unit 120 is configured to generate the CRC value using a predefined polynomial.

The fingerprinting unit 120 comprises a plurality of stages S1-S5, such as, for example, five stages. While the mathematical basis is beyond the scope of the present application, the number stages defines the order (i.e., the number of terms) of the predefined polynomial. For example, where the fingerprinting unit 120 comprises Y stages, the predefined polynomial is of the (Y+1)th order. The stages S1-S5 are connected in series with an output of a last stage (e.g., stage S5) feeding back to an input of a first stage (e.g., stage S1) over a feedback line 406. Further, the stages S1-S5 each comprise a flip flop 408, and one or more of the stages S1-S5 each comprise a XOR gate 410, where the one or more stages include the last stage.

The flip flops 408 define corresponding inputs of the stages S1-S5, and define corresponding outputs of stages without XOR gates. Further, the flip flops 408 respectively have internal states representing bits of data and defining a register (e.g., the internal register 214 of FIG. 2). Even more, the flip flops 408 are clocked in parallel by a clock line 412 and are reset in parallel by a reset line 414. For example, in response to pulsing the reset line 414, the flip flops 408 are configured to reset the internal states to default values, such as, for example, "0". As another example, in response to a clock cycle on the clock line 412, the flip flops 408 are configured to set the internal states to corresponding inputs.

The one or more XOR gates 410 each define an output of a corresponding stage. The XOR gate of the last stage is configured to exclusive OR together an output of a corresponding flip flop and data on the input line 402. Remaining XOR gates are each configured to exclusive OR together an output of a corresponding flip flop and data on the feedback line 406. While the mathematical basis is beyond the scope of the present application, the locations of the one or more XOR gates 410 define the coefficients of the predefined polynomial. The terms of the predefined polynomial, except the lowest order term of the predefined polynomial, correspond to the stages S1-S5, and those terms corresponding to stages with XOR gates have coefficients of 1. Other terms, except the lowest order term, have coefficients of zero. For example, the predefined polynomial is illustrated as $x^5+x^3+x^2+1$.

While the fingerprinting unit 120 is illustrated with a particular arrangement of flip flops and XOR gates, and hence a particular predefined polynomial, it is to be appreciated that other embodiments of the fingerprinting unit 120 may comprise different arrangements of the flip flops and XOR gates, and hence different predefined polynomials. Further, while the fingerprinting unit 120 is illustrated with five stages, it is to be appreciated that other embodiments of the fingerprinting unit may have more or less stages.

Figure 5:
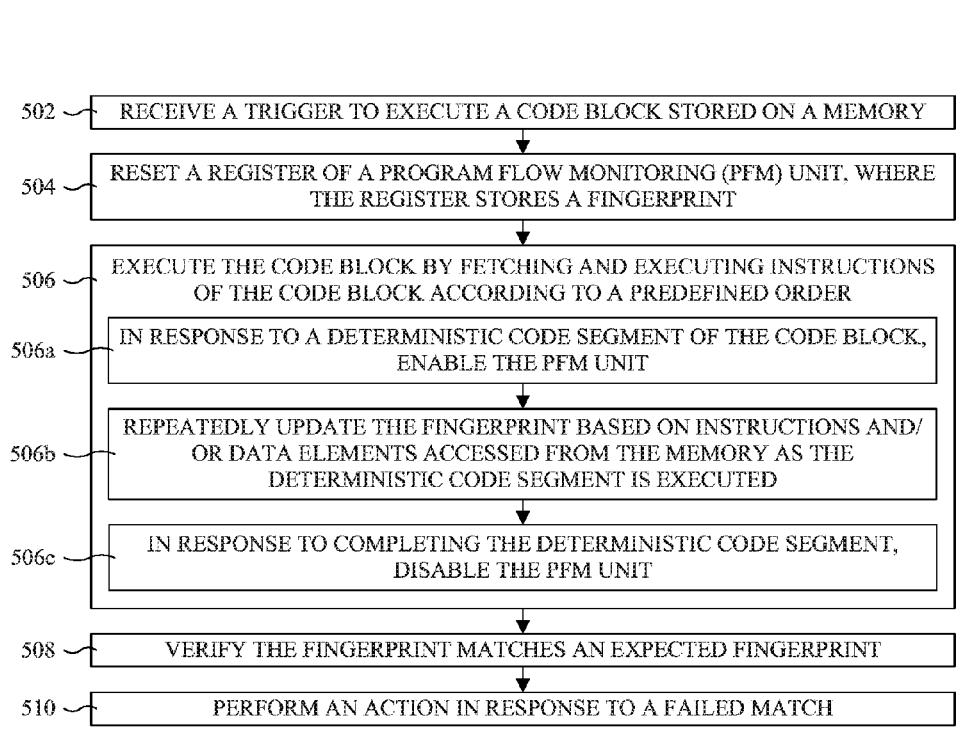
FIG. 5 illustrates a block diagram of some embodiments of a method for program flow monitoring, as performed in FIGS. 1 and/or 2.

With reference to FIG. 5, a block diagram 500 of some embodiments of a method for program flow monitoring, as performed in FIGS. 1 and/or 2, is provided.

At 502, a trigger to execute a code block stored on a memory is received. The trigger may, for example, be received from a remote device or controller.

At 504, a register of a PFM unit is reset, where the register stores a fingerprint. In some embodiments, the register is reset immediately before executing the code block.

At 506, the code block is executed by fetching and executing instructions of the code block according to a predefined order. At 506a, in response to a deterministic code segment of the code block, the PFM unit is enabled. For example, the PFM unit is enabled immediately before the deterministic code segment. At 506b, the fingerprint is repeatedly updated based on accesses to the memory and as the deterministic code segment is executed. For example, the fingerprint may be updated for each instruction and/or data element accessed from the memory during execution of the deterministic code segment. At 506c, in response to completing the deterministic code segment, the PFM unit is disabled. For example, the PFM unit is disabled immediately after the deterministic code segment. In some embodiments, the actions of 506a-506c are repeated for each additional deterministic code segment of the code block.

At 508, the fingerprint is verified to match an expected fingerprint. The verification may, for example, be performed at the remote device or controller.

At 510, an action is performed in response to a failed match. For example, an audio and/or visual alert may be generated of the failure.

While the method described by the block diagram 500 is illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. Further, not all illustrated acts may be required to implement one or more aspects or embodiments of the description herein, and one or more of the acts depicted herein may be carried out in one or more separate acts and/or phases.

Figure 6:
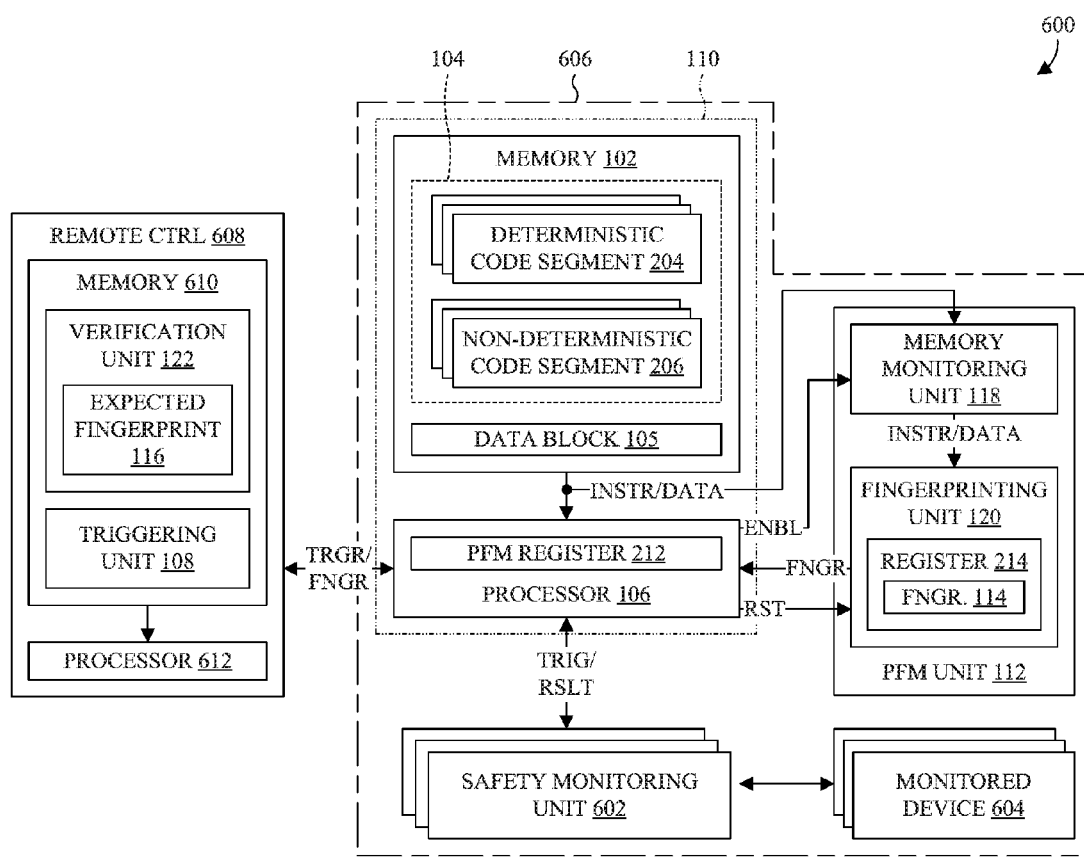
FIG. 6 illustrates a block diagram of some embodiments of a safety system in which the programmable system of FIGS. 1 and/or 2 finds application.

With reference to FIG. 6, a block diagram 600 of some embodiments of a safety system in which the programmable system of FIGS. 1 and/or 2 finds application is provided. As illustrated, one or more safety monitoring units 602 are configured to perform tests on one or more monitored devices 604. The safety monitoring unit(s) 602 are hardware devices and, in some embodiments, are manufactured and/or designed to a safety standard, such as, for example, ISO 26262. Further, in some embodiments, the safety monitoring unit(s) 602 are configured to evaluate results of the tests and to generate an alert in response to a failed test. The monitored device(s) 604 are, for example, hardware devices and/or are, for example, electronic devices, such as a power supply, a radio frequency (RF) receive chain, or an RF transmit chain.

A processor 106 is configured to execute a code block 104 stored on a memory 102 to trigger the tests. Further, in some embodiments, the processor 106 is configured to execute the code block 104 to evaluate results of the tests, and to selectively act depending on the evaluations. For example, the processor 106 may generate an alert in response to a failed test. The code block 104 is a set of instructions that are configured for execution in a predefined order, and that are grouped into one or more deterministic code segments 204 and, in some embodiments, one or more non-deterministic code segments 206. In some embodiments, the processor 106 accesses a data block 105 on the memory 102 while executing the code block 104. The data block 105 is a set of data elements accessed (e.g., read or written) during execution of the code block 104, and the data elements may be, for example, non-executable data or data that isn't executed during execution of the code block 104. Further yet, the processor 106 is configured to execute the instructions in response to a trigger from a triggering unit 108, and by fetching and executing the instructions from the memory 102 in the predefined order. The processor 106 may be, for example, a microprocessor or some other electronic processor, and/or may be, for example, integrated with the memory 102 in a microcontroller 110.

While the processor 106 ideally executes the instructions of the code block 104 according to the predefined order, there may be deviations between the executed order and the predefined order. Therefore, a PFM unit 112 is configured to deterministically generate a fingerprint 114 from memory accesses while executing the deterministic code segment(s) 204, and a verification unit 122 is configured to verify the generated fingerprint 114 matches an expected fingerprint 116. If there is a match, there is advantageously a high likelihood that the instructions of the code block 104 executed in the predefined order. In some embodiments, the memory accesses comprise instruction fetches and/or accesses to the data block 105. The PFM unit 112 comprises a memory monitoring unit 118 and a fingerprinting unit 120, and may, for example, be integrated into an integrated circuit (IC) 606 with the processor 106, the memory 102, the safety monitoring unit(s) 602, and the monitored device(s) 604.

The memory monitoring unit 118 is configured to monitor memory accesses by the processor 106, and to provide the memory accesses to the fingerprinting unit 120. For example, the memory monitoring unit 118 may provide fetched instructions to the fingerprinting unit 120, or accessed data elements (e.g., read or written data elements) to the fingerprinting unit 120. The processor 106 may, for example, be configured to enable the memory monitoring unit 118 while executing the deterministic code segment(s) 204, and to disable the memory monitoring unit 118 while executing the non-deterministic code segment(s) 206. The fingerprinting unit 120 comprises an internal register 214 storing the fingerprint 114, and is configured to deterministically generate the fingerprint 114 based on memory accesses received from the memory monitoring unit 118 following a last reset of the internal register 214. As memory accesses are received, the fingerprint 114 is repeatedly updated. The processor 106 may, for example, be configured to reset the internal register 214 immediately before executing the code block 104. Further, the processor 106 may, for example, be configured to access the fingerprint 114 through a PFM register 212 that is local to the processor 106 and that is loaded from the PFM unit 112.

A remote controller 608 comprises the triggering unit 108 and the verification unit 122, and is remote from the processor 106 and, in some embodiments, the IC 606. In some embodiments, the remote controller 608 communicates with the processor 106 via a serial peripheral interface (SPI) databus. For example, the triggering unit 108 may trigger execution of the code block 104 by the processor 106, and/or the verification unit 122 may receive the fingerprint 114 from processor 106, over the SPI databus. Further, in some embodiments, the remote controller 608 further comprises a second memory 610 and a second processor 612. In such embodiments, the remote controller 608 may be, for example, a microcontroller, and/or the triggering unit 108 and/or the verification unit 122 may, for example, be software stored on the second memory 610 and executed by the second processor 612.

While the verification unit 122 and the triggering unit 108 are shown within the remote controller 608, it is to be appreciated that the verification unit 122 and/or the triggering unit 108 may be local to the processor 106 and/or the IC 606 in other embodiments of the safety system. For example, the verification unit 122 or the triggering unit 108 may be a software module stored in the memory 102 and executed by the processor 106. Further, while the safety system is shown with the remote controller 608, the remote controller 608 may be omitted in other embodiments. For example, where the verification unit 122 and the triggering unit 108 are both local to the processor 106 and/or the IC 606, the remote controller 608 may be omitted.

Figure 7:
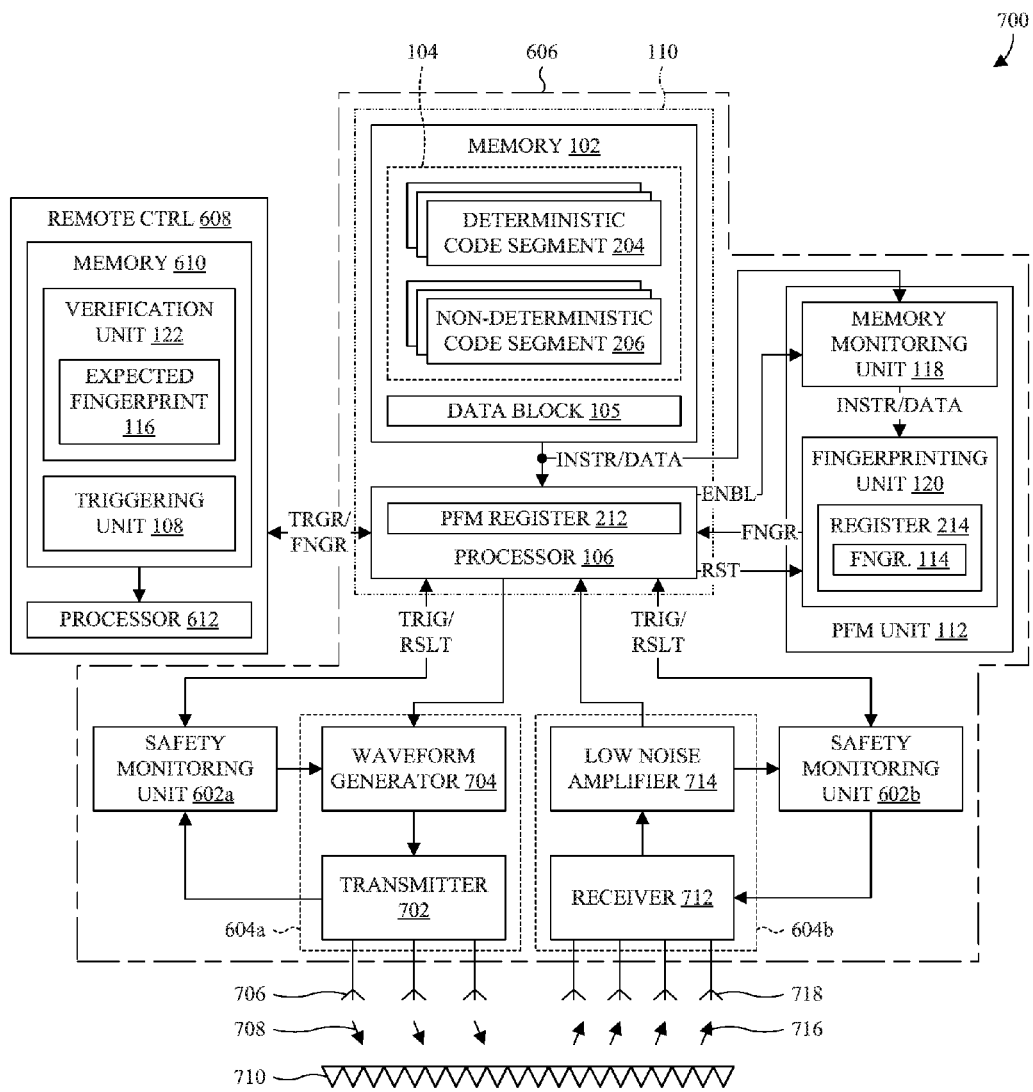
FIG. 7 illustrates a block diagram of some more detailed embodiments of the safety system of FIG. 6 in which is the system is employed for radar monitoring.

With reference to FIG. 7, a block diagram 700 of some more detailed embodiments of the safety system of FIG. 6 is provided in which the system is employed for radar monitoring. For example, the safety system may be employed for automotive radar monitoring. As illustrated, a processor 106 is configured to execute instructions stored on a memory 102 to control an RF transmit chain 604a and an RF receive chain 604b for radar monitoring. For example, the processor 106 may control the RF transmit chain 604a and the RF receive chain 604b for blind spot monitoring in an automobile.

The RF transmit chain 604a comprises an RF transmitter 702 and, in some embodiments, a waveform generator 704. The RF transmitter 702 is configured to drive corresponding transmit antennas 706 to emit radio waves 708 towards a radar target 710. Further, in some embodiments, the RF transmitter 702 is configured to emit the radio waves 708 at a frequency of about 24, 76-81 gigahertz (GHz). The waveform generator 704 is configured to provide the processor 106 with a digital interface for controlling the RF transmitter 702. For example, based on commands from the processor 106, the waveform generator 704 may generate a signal controlling a local oscillator (LO) of the RF transmitter 702. Further, in some embodiments, the waveform generator 704 communicates with the processor 106 via a SPI databus.

The RF receive chain 604b comprises an RF receiver 712 and, in some embodiments, a low noise amplifier 714. The RF receiver 712 is configured to receive reflections 716 of the radio waves 708 off the radar target 710 via corresponding receive antennas 718. Further, the RF receiver 712 is configured to output representative signals of the reflections 716 to the processor 106. The low noise amplifier 714 is configured to amplify the signals before they pass to the processor 106 while minimizing noise introduced into the signals. While not shown, in some embodiments, the signals pass to the processor 106 through an analog-to-digital (ADC) converter. The ADC may, for example, be part of the RF receive chain 604b and/or may, for example, be integrated with the low noise amplifier 714.

Because the RF transmit chain 604a and the RF receive chain 604b may play a critical role in ensuring the safety of drivers and passengers in an automobile, safety monitoring units 602a, 602b are respectively configured to perform safety tests on the RF transmit chain 604a and the RF receive chain 604b to ensure proper operation. For example, a first safety monitoring unit 602a of the RF transmit chain 604a may be configured to input a test command into the waveform generator 704, and to compare an output of the RF transmitter 702 to an expected output to identify a problem with the RF transmit chain 604a. As another example, a second safety monitoring unit 602b of the RF receive chain 604a may be configured to input a test signal into the RF receiver 712, and to compare an output of the low noise amplifier 714 or the ADC to an expected output to identify a problem with the RF receive chain 604b. The safety monitoring unit(s) 602a, 602b are hardware devices and, in some embodiments, are configured to evaluate results of the tests and to generate an alert in response to a failed test.

In addition to controlling the RF transmit chain 604a and the RF receive chain 604b, the processor 106 is configured to execute a code block 104 stored on the memory 102 to trigger and, in some embodiments, coordinate the tests. Further, in some embodiments, the processor 106 is configured to execute the code block 104 to evaluate results of the tests, and to selectively act (e.g., generate an alert) depending on the evaluation. The processor 106 may, for example, begin executing the code block 104 in response to a trigger from a triggering unit 108, which may be local or remote to the processor 106.

While the processor 106 ideally executes instructions of the code block 104 according to a predefined order prescribed by the code block 104, there may be deviations between the executed order and the predefined order. Therefore, a PFM unit 112 is configured to deterministically generate a fingerprint 114 from memory accesses while executing deterministic code segment(s) 204 of the code block 104, and a verification unit 122 is configured to verify the generated fingerprint 114 matches an expected fingerprint 116. The memory accesses may be, for example, instruction fetches from the memory 102 or accesses to a data block 105 on the memory 102. If there is a match, there is a high likelihood that the instructions of the code block 104 executed in the predefined order. The PFM unit 112 comprises a memory monitoring unit 118 and a fingerprinting unit 12. Further, the PFM unit 112 may, for example, be integrated into an integrated circuit (IC) 606 with the processor 106, the memory 102, the first and second safety monitoring units 602a, 602b, and the RF transmit and receive chains 604a, 604b.

Figure 8:
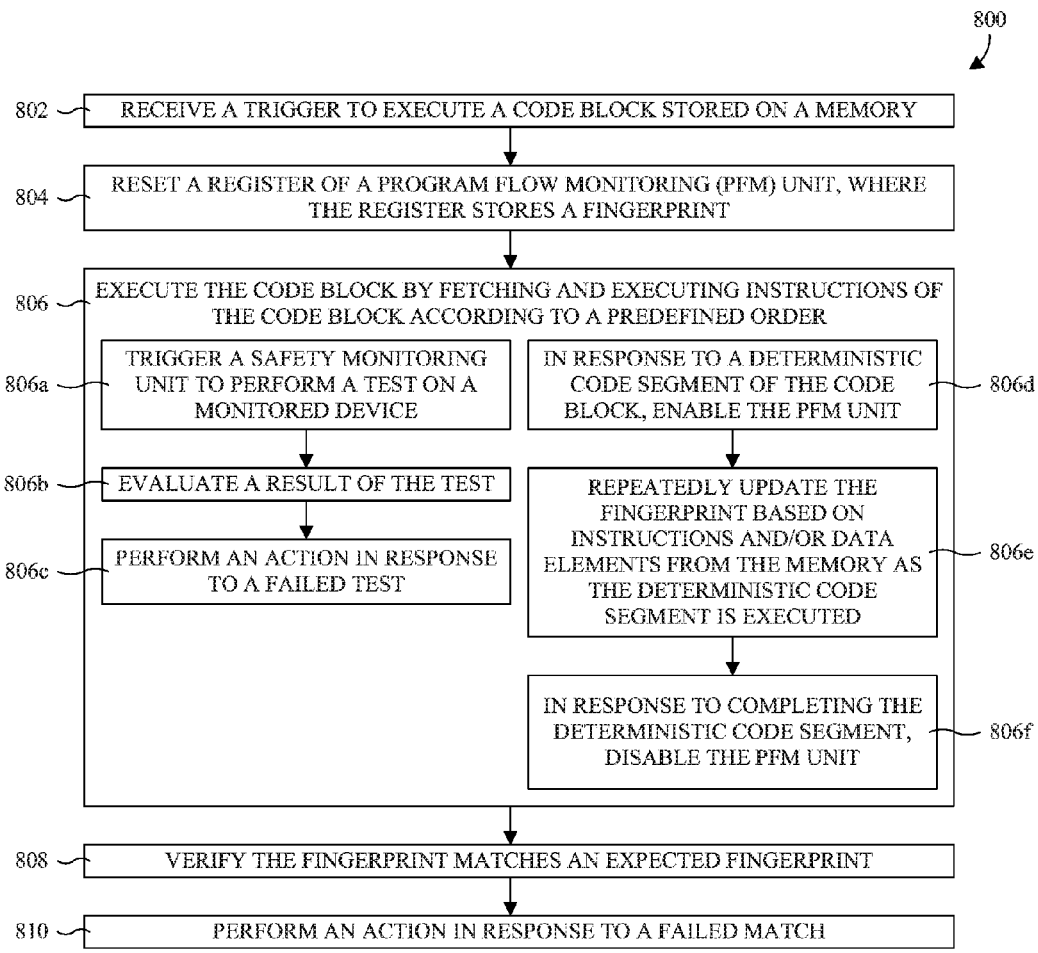
FIG. 8 illustrates a block diagram of some embodiments a method for safety monitoring, as performed in FIGS. 7 and/or 8.

With reference to FIG. 8, a block diagram 800 of some embodiments a method for safety monitoring, as performed in FIGS. 7 and/or 8, is provided.

At 802, a trigger to execute a code block stored on a memory is received. The trigger may, for example, be received from a remote controller or device, such as the remote controller 608 in FIGS. 7 and/or 8.

At 804, a register of a PFM unit is reset, where the register stores a fingerprint. For example, where the PFM unit comprises the fingerprinting unit 120 of FIG. 4, the reset line 414 of FIG. 4 may be pulsed.

At 806, the code block is executed by fetching and executing instructions of the code block according to a predefined order.

At 806a, a safety monitoring unit is triggered to perform a test on a monitored device. Further, in some embodiments, a result of the test is evaluated and an action is performed in response to a failed test respectively at 806b and 806c. At 806d, the PFM unit is enabled in response to a deterministic code segment of the code block. At 806e, the fingerprint is repeatedly updated based on accesses to the memory while the deterministic code segment is executed. The memory accesses may be, for example, instruction fetches or accesses to a data block of data elements. The accesses may be, for example, read or write operations. The data elements may be, for example, non-executable data elements. At 806f, the PFM unit is disabled in response to completing the deterministic code segment. The actions at 806d-806f are performed one or more times (depending on the number of deterministic code segments in the code block), and are performed in parallel with the actions of 806a and, in some embodiments, 806b and 806c.

At 808, the fingerprint is verified to match an expected fingerprint. The verification may, for example, be performed at a remote controller or device, such as the remote controller 608 in FIGS. 7 and/or 8.

At 810, an action is performed in response to a failed match. For example, an audio and/or visual alert may be generated if the fingerprint does not match an expected fingerprint.

While the method described by the block diagram 800 is illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. Further, not all illustrated acts may be required to implement one or more aspects or embodiments of the description herein, and one or more of the acts depicted herein may be carried out in one or more separate acts and/or phases.

Thus, in some embodiments, the present disclosure provides a programmable system. A memory is configured to store a set of instructions, where the instructions are configured to be executed in a predefined order. A processor is configured to execute the set of instructions by fetching and executing the instructions from the memory and in the predefined order. A PFM unit is configured to deterministically generate a fingerprint from accesses to the memory by the processor while executing the set of instructions. A verification unit is configured to compare the generated fingerprint to an expected fingerprint to determine whether the set of instructions executed in the predefined order.

In other embodiments, the present disclosure provides a method for monitoring the flow of a program. A trigger to execute a set of instructions is received, where the set of instructions comprise a deterministic segment and a non-deterministic segment. The set of instructions is executed by a processor, where the set of instructions is executed by fetching and executing the instructions from a memory according to a predefined order. A fingerprint is deterministically generated from accesses to the memory while executing the deterministic segment, but not from accesses to the memory while executing the non-deterministic segment. The generated fingerprint is compared to an expected fingerprint to determine whether the set of instructions executed according to the predefined order.

In yet other embodiments, the present disclosure provides a safety system. A safety monitoring unit is configured to perform a test on the monitored device. A memory is configured to store a set of instructions, where the set of instructions comprise a deterministic segment and a non-deterministic segment, and where the instructions are configured to trigger the test and are configured to be executed in a predefined order. A processor is configured to execute the set of instructions by fetching and executing the instructions from the memory according to the predefined order. A PFM unit is configured to deterministically generate a fingerprint from accesses to the memory while executing the deterministic segment, but not from accesses to the memory while executing the non-deterministic segment. A verification unit is configured to compare the generated fingerprint to an expected fingerprint to determine whether the set of instructions executed in the predefined order.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A programmable system, comprising:
   an electronic memory configured to store a set of instructions, wherein the set of instructions comprise a deterministic segment and a non-deterministic segment, and wherein instructions of the deterministic segment are configured to be executed in a predefined order;
   an electronic processor configured to execute the set of instructions by fetching and executing the instructions from the electronic memory;
   a program flow monitoring (PFM) unit independent of the electronic processor and the electronic memory, wherein the PFM unit is configured to deterministically generate a fingerprint while executing the set of instructions, wherein the fingerprint is generated from accesses to the electronic memory by the electronic processor while executing the deterministic segment, but not from accesses to the electronic memory by the electronic processor while executing the non-deterministic segment, and wherein the fingerprint comprises an order in which the instructions of the deterministic segment are fetched and executed from the electronic memory while executing the set of instructions; and
   a verification unit configured to compare the generated fingerprint to an expected fingerprint to determine whether the deterministic segment executed in the predefined order, wherein the verification unit is configured to generate an alert or perform a corrective action in response to a mismatch between the generated fingerprint and the expected fingerprint;
   wherein the electronic processor is configured to enable the PFM unit immediately before executing the deterministic segment and to disable the PFM unit immediately after executing the deterministic segment.

2. The programmable system according to claim 1, wherein the PFM unit is configured to cyclically update the fingerprint with each instruction fetched while executing the deterministic segment.

3. The programmable system according to claim 1, wherein the electronic memory is configured to store a set of data elements, wherein the set of instructions are configured to access the set of data elements during execution, and wherein the PFM unit is configured to cyclically update the fingerprint with each data element accessed while executing the deterministic segment.

4. The programmable system according to claim 1, wherein the PFM unit is configured to generate the fingerprint as a cyclic redundancy check (CRC) value of accesses to the electronic memory while executing the deterministic segment.

5. The programmable system according to claim 1, wherein the PFM unit comprises a fingerprinting unit configured to deterministically generate the fingerprint, wherein the fingerprinting unit comprises an internal register storing the fingerprint, wherein the electronic processor is configured to reset the internal register immediately before executing the set of instructions, and wherein the internal register is implemented in hardware and is independent of the electronic memory and the electronic processor.

6. The programmable system according to claim 1, wherein the PFM unit is configured to cyclically update the fingerprint with each instruction fetched while executing the deterministic segment, and wherein the electronic processor is configured to reset the fingerprint to a null value immediately before executing the set of instructions.

7. The programmable system according to claim 1, wherein the instructions fetched and executed from the electronic memory while executing the set of instructions are ordered differently than the instructions of the set.

8. The programmable system according to claim 1, wherein the PFM unit comprises a memory monitor unit, and wherein the memory monitor unit monitors accesses to the electronic memory through a databus between the electronic processor and the electronic memory.

9. The programmable system according to claim 1, further comprising:
   a monitored device; and
   a safety monitoring unit configured to perform a test on the monitored device, wherein the set of instructions is configured to trigger the test.

10. The programmable system according to claim 9, wherein the monitored device is a radio frequency (RF) receive or transmit chain in a radar system.

11. The programmable system according to claim 10, wherein the safety monitoring unit is a hardware device that is independent of the electronic processor, and wherein the safety monitoring unit is configured to input a test signal into an input of the monitored device, and to compare an output of the monitored device to an expected output for the test signal.

12. The programmable system according to claim 9, wherein the monitored device, the safety monitoring unit, the electronic processor, the electronic memory, and the PFM unit are integrated together into an integrated circuit.

13. The programmable system according to claim 12, further comprising:
   a remote controller comprising the verification unit and a triggering unit, wherein remote controller is remote from the integrated circuit, and wherein the triggering unit is configured to trigger the electronic processor to begin executing the set of instructions.

14. A programmable system, comprising:
   a memory configured to store a set of instructions, wherein the instructions are configured to be executed in a predefined order;
   a processor configured to execute the set of instructions by fetching and executing the instructions from the memory and in the predefined order;
   a program flow monitoring (PFM) unit configured to deterministically generate a fingerprint from accesses to the memory by the processor while executing the set of instructions, wherein the PFM unit comprises a fingerprinting unit configured to deterministically generate the fingerprint, wherein the fingerprinting unit comprises a plurality of stages electrically coupled in series and each comprising a flip flop, wherein an output of a last stage feeds back to an input of a first stage through a feedback line, and wherein the number of stages is equal to the number of bits in the fingerprint; and
   a verification unit configured to compare the generated fingerprint to an expected fingerprint to determine whether the set of instructions executed in the predefined order.

15. The programming system according to claim 14, wherein the flip flops are electrically coupled in parallel to a common clock line and a common reset line, wherein inputs of the flip flops respectively define inputs of the stages, and wherein the last stage comprises a XOR gate exclusive ORing an input line and an output of a corresponding flip flop.

16. The programming system according to claim 15, wherein one or more additional stages each comprise a XOR gate exclusive ORing the feedback line and an output of a corresponding flip flop.

17. A method for monitoring the flow of a program, comprising:

receiving a trigger to execute a set of instructions, wherein the set of instructions comprise a deterministic segment and a non-deterministic segment, and wherein instructions of the deterministic segment are in a predefined order;

executing the set of instructions by an electronic processor, wherein the set of instructions is executed by fetching and executing the instructions from an electronic memory;

deterministically generating a fingerprint while executing the set of instructions, wherein the fingerprint is generated by a program flow monitoring (PFM) unit that is independent of the electronic processor and the electronic memory, and wherein the fingerprint is generated from accesses to the electronic memory while executing the deterministic segment, but not from accesses to the electronic memory while executing the non-deterministic segment;

enabling the PFM unit immediately before executing the deterministic segment;

disabling the PFM unit immediately after executing the deterministic segment; and comparing the generated fingerprint to an expected fingerprint to determine whether the deterministic segment executed according to the predefined order, wherein alerts or initiation of corrective measures are implemented if the generated fingerprint is different from the expected fingerprint.

18. The method according to claim 17, further comprising:

resetting the fingerprint to a null value immediately before executing the set of instructions; and updating the fingerprint with each instruction fetched while executing the deterministic segment.

19. The method according to claim 18, further comprising:

updating fingerprint with each access to non-executable data on the electronic memory.

20. The method according to claim 17, wherein the fingerprint is generated as a cyclic redundancy check (CRC) value of accesses to the electronic memory while executing the deterministic segment.

* * * * *